United States Patent
Yoo et al.

(10) Patent No.: US 9,856,911 B2
(45) Date of Patent: Jan. 2, 2018

(54) CENTER SUPPORTING DEVICE FOR PROPELLER SHAFT OF VEHICLE

(71) Applicant: Hyundai Motor Company, Seoul (KR)

(72) Inventors: Sung Su Yoo, Hwaseong-si (KR); Won Jun Choi, Yangsan-si (KR); Dong Jin Hwang, Busan (KR)

(73) Assignee: Hyundai Motor Company, Seoul (KR)

( * ) Notice: Subject to any disclaimer, the term of this patent is extended or adjusted under 35 U.S.C. 154(b) by 22 days.

(21) Appl. No.: 14/933,970

(22) Filed: Nov. 5, 2015

(65) Prior Publication Data

US 2016/0305475 A1 Oct. 20, 2016

(30) Foreign Application Priority Data

Apr. 14, 2015 (KR) ........................ 10-2015-0052118

(51) Int. Cl.
*F16C 23/08* (2006.01)
*F16C 27/06* (2006.01)
*B60K 17/24* (2006.01)
*F16C 31/04* (2006.01)
*F16C 19/18* (2006.01)

(52) U.S. Cl.
CPC ............ *F16C 27/066* (2013.01); *B60K 17/24* (2013.01); *F16C 23/08* (2013.01); *F16C 31/04* (2013.01); *F16C 19/183* (2013.01); *F16C 23/086* (2013.01); *F16C 2326/06* (2013.01)

(58) Field of Classification Search
CPC .... F16C 23/082; F16C 23/084; F16C 23/086; F16C 27/066; F16C 31/04; F16C 2326/06; F16C 2326/30
See application file for complete search history.

(56) References Cited

U.S. PATENT DOCUMENTS

| | | | | |
|---|---|---|---|---|
| 1,622,880 | A | * | 3/1927 | Perkins .................. F16C 19/08 384/512 |
| 2,165,155 | A | * | 7/1939 | Schmal .................. B60K 17/24 277/500 |
| 3,353,876 | A | * | 11/1967 | Moyer .................. B21D 37/10 384/43 |
| 3,490,251 | A | * | 1/1970 | Roethlisberger ...... F16C 21/005 464/113 |
| 4,408,806 | A | * | 10/1983 | Orain ..................... F16C 19/46 384/452 |
| 2013/0287330 | A1 | | 10/2013 | Ikeda |

FOREIGN PATENT DOCUMENTS

| | | | |
|---|---|---|---|
| DE | 102007008579 | * | 8/2008 |
| JP | 5-215120 A | | 8/1993 |
| JP | 6-27279 U | | 4/1994 |

(Continued)

*Primary Examiner* — James Pilkington
(74) *Attorney, Agent, or Firm* — Morgan, Lewis & Bockius LLP

(57) ABSTRACT

A center supporting device for a propeller shaft of a vehicle may include an inner bearing device configured to axially movably support a stub shaft, the stub shaft being connected between a front shaft and a rear shaft of the propeller shaft, an outer bearing device mounted outside the inner bearing device to axially rotatably support the stub shaft, and an insulator mounted in an elastically deformable manner between the outside of the outer bearing device and a bracket fixed to a vehicle body.

7 Claims, 8 Drawing Sheets

(56) References Cited

FOREIGN PATENT DOCUMENTS

| | | |
|---|---|---|
| JP | 11-351247 A | 12/1999 |
| JP | 2001-182744 A | 7/2001 |
| JP | 2007-98984 A | 4/2007 |
| KR | 2002-0006893 A | 1/2002 |
| KR | 10-2007-0045604 A | 5/2007 |
| KR | 10-2008-0037290 A | 4/2008 |
| KR | 10-2013-0065102 A | 6/2013 |

* cited by examiner

Spherical surface

[ LENGTH VARIATION ABSORPTION ]

[ ROTATING SHAFT SUPPORTING ]

[ BENDING ANGLE ABSORPTION ]

[ VIBRATION ISOLATION AND SMALL DISPLACEMENT ABSORPTION ]

CENTER SUPPORTING DEVICE FOR PROPELLER SHAFT OF VEHICLE

CROSS-REFERENCE TO RELATED APPLICATION

The present application claims priority to Korean Patent Application No. 10-2015-0052118 filed Apr. 14, 2015, the entire contents of which is incorporated herein for all purposes by this reference.

BACKGROUND OF THE INVENTION

Field of the Invention

The present invention relates to a center supporting device for a propeller shaft of a vehicle. More particularly, the present invention relates to a center supporting device for a propeller shaft of a vehicle, which movably supports a stub shaft that connects a front shaft of the propeller shaft with a rear shaft of the propeller shaft and fixes the stub shaft to a vehicle body.

Description of Related Art

A propeller shaft is a shaft that transmits drive power between a transmission (or a transfer case) and a rear differential gear of a four-wheel-drive or rear-wheel-drive vehicle. The propeller shaft may be easily damaged by generation of vibration when increased in length because it is rotated at high speeds while receiving continuous torsion torque and, therefore, utilizes a divided structure. Generally, the propeller shaft is configured using three joints and two tubes.

FIG. 1 is a perspective view illustrating a conventional propeller shaft, and FIG. 2 is a sectional view illustrating a center bearing and bracket assembly mounted to the conventional propeller shaft.

The conventional propeller shaft is located between a transmission (or a transfer case) and a rear differential gear. As illustrated in FIG. 1, the conventional propeller shaft is configured as a structure using three joints and two tubes, which is capable of absorbing movement displacement (variation in length and bending angle of the propeller shaft) caused by movement of the transmission and the rear differential gear during vehicle behavior. The joints are respectively located at an input component 1 coupled to the transmission, an output component 2 coupled to the rear differential gear, and a center component 3 connecting two tubes 4 and 5 to each other.

Each of the input component 1, the output component 2, and the center component 3 has a spline joint structure. The center component 3 is fixed to a vehicle body via a center bearing and bracket assembly 6 and supports the propeller shaft 10 that transmits drive power via rotation thereof.

As illustrated in FIG. 2, the center bearing and bracket assembly 6, which rotatably supports a stub shaft A that connects a front shaft 4 and a rear shaft 5 of the conventional propeller shaft 10 to each other and fixes the stub shaft A to a vehicle body, generally includes a bearing 7, an insulator 8, and a bracket 9. An inner race of the bearing 7 presses and supports the rotating propeller shaft 10. The insulator 8 is located between an outer race of the bearing 7 and the bracket 9 and serves to support the propeller shaft 10, to control displacement behavior of the propeller shaft 10, and to isolate (reduce) vibration (e.g., vibration of a drive system) transmitted from each part to the vehicle body. The bracket 9 is fixed to the vehicle body via, for example, bolts or nuts.

Meanwhile, movement of the transmission and the rear differential gear (rolling of the transmission and pitching of the rear differential gear) may occur at the time of acceleration/deceleration and braking of a vehicle because the transmission and the rear differential gear are formed of an elastic material such as, for example, rubber and flexibly mounted to a vehicle body frame and a sub frame. When the movement is transmitted to the propeller shaft, this may cause large displacement of the propeller shaft.

In addition, movement (e.g., forward/rearward, leftward/rightward, and upward/downward movement) of the propeller shaft may occur according to, for example, traveling conditions, load variation, and road surface conditions.

Accordingly, the propeller shaft essentially requires a structure capable of absorbing various types of movement caused according to traveling conditions.

In the case of the center bearing and bracket assembly that rotatably supports the center component of the propeller shaft and fixes the center component to the vehicle body, the insulator is deformed in proportion to a movement degree of the propeller shaft while the propeller shaft is undergoing the movement as described above because the center bearing is moved along with the propeller shaft, the bracket is fixed to the vehicle body, and the insulator connects the center bearing and the bracket to each other. In addition, the insulator may be assembled in a permanently deformed state according to an initial configuration state (installation angles and installation positions of the transmission and the rear differential gear) regardless of the movement of the propeller shaft.

That is, the insulator functions not only to isolate vibration transmitted from the transmission to the vehicle body through the propeller shaft or vibration generated in the propeller shaft (vibration generated by unbalance of a rotator or joint characteristics), but also to absorb large displacement (variation in length and bending angle of the propeller shaft) caused by movement of the transmission and the differential gear.

Although the rigidity of the insulator between the center bearing and the bracket may be set to be low (soft) in order to maximize vibration isolation, this may cause the insulator to be easily deformed even by low load, thus deteriorating durability. Conversely, when the rigidity of the insulator is set to be high (hard), this may be advantageous for displacement control or durability, but deteriorate vibration isolation performance, thus easily causing Noise, Vibration, and Harshness (NVH) problems. In addition, vibration isolation acts as resistance against variation in length and bending angle of the propeller shaft caused during movement of the transmission and the rear differential gear and, therefore, may cause other side effects.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a center supporting device for a propeller shaft of a vehicle, which is capable of achieving high vibration isolation and durability performances in both large displacement and small displacement situations via a double bearing structure.

According to various aspects of the present invention, a center supporting device for a propeller shaft of a vehicle may include an inner bearing device configured to axially movably support a stub shaft, the stub shaft being connected between a front shaft and a rear shaft of the propeller shaft, an outer bearing device mounted outside the inner bearing device to axially rotatably support the stub shaft, and an insulator mounted in an elastically deformable manner between the outside of the outer bearing device and a bracket fixed to a vehicle body.

The inner bearing device may include an inner pipe surrounding an outer circumferential surface of the stub shaft, and a plurality of inner balls rotatably supported between the stub shaft and the inner pipe.

An inner ball cage may be disposed inside the inner pipe to maintain a constant spacing distance and arrangement of the inner balls and to axially movably support the inner balls.

The outer circumferential surface of the stub shaft and an inner circumferential surface of the inner pipe may be provided with ball grooves, the ball grooves being formed in the axial direction and spaced apart from one another in a circumferential direction for stabilized seating of the inner balls.

The outer bearing device may include an inner race surrounding an outer circumferential surface of the inner bearing device, an outer race surrounding an inner circumferential surface of the insulator, and a plurality of outer balls arranged in a circumferential direction and rotatably supported between the inner race and the outer race.

The outer race may have a spherical inner circumferential surface surrounding the inner bearing device, the inner race may have a ball groove formed in an outer circumferential surface thereof for seating of the outer balls, and the outer balls may be movable along the spherical inner circumferential surface of the outer race between the spherical inner circumferential surface and the ball groove.

A ball stopper may be provided between the outer race and the inner bearing device to limit movement of the outer balls along a spherical inner circumferential surface of the outer race.

A first side of the ball stopper may be fixed in close contact with the outer circumferential surface of the inner bearing device and a second side of the ball stopper may be provided with a sealing portion elastically coming into close contact with the inner circumferential surface of the outer race.

A retainer ring may be mounted at one side of the stub shaft to prevent axial separation of the inner bearing device.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
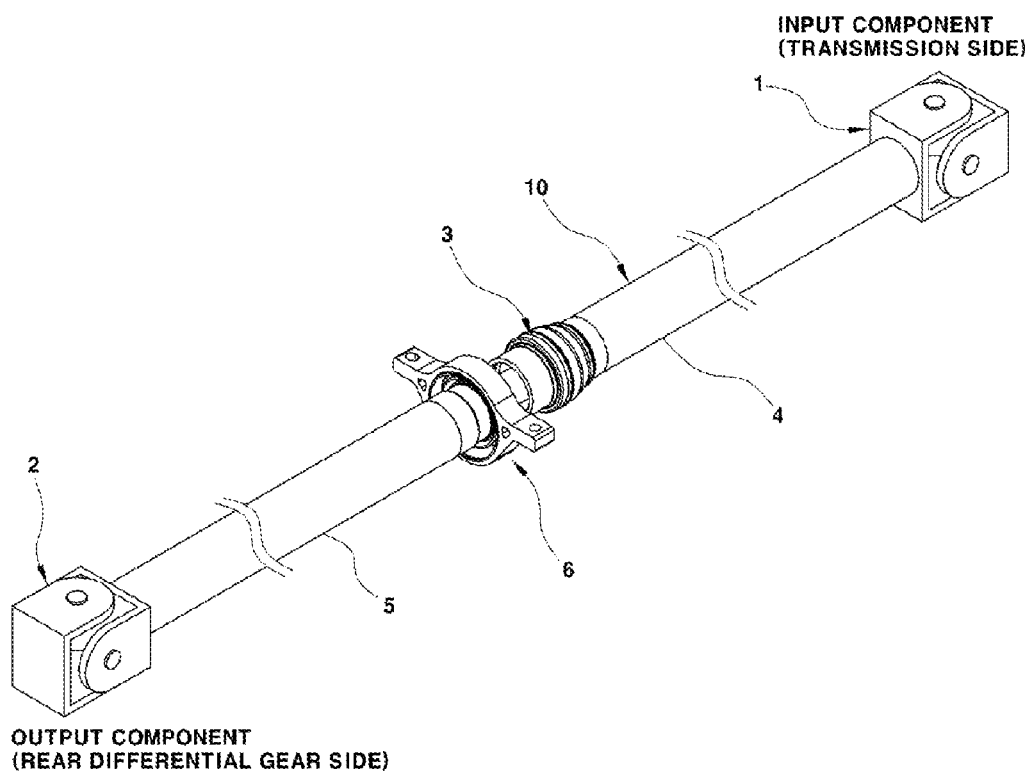
FIG. 1 is a perspective view illustrating a conventional propeller shaft according to the related art.
Figure 2:
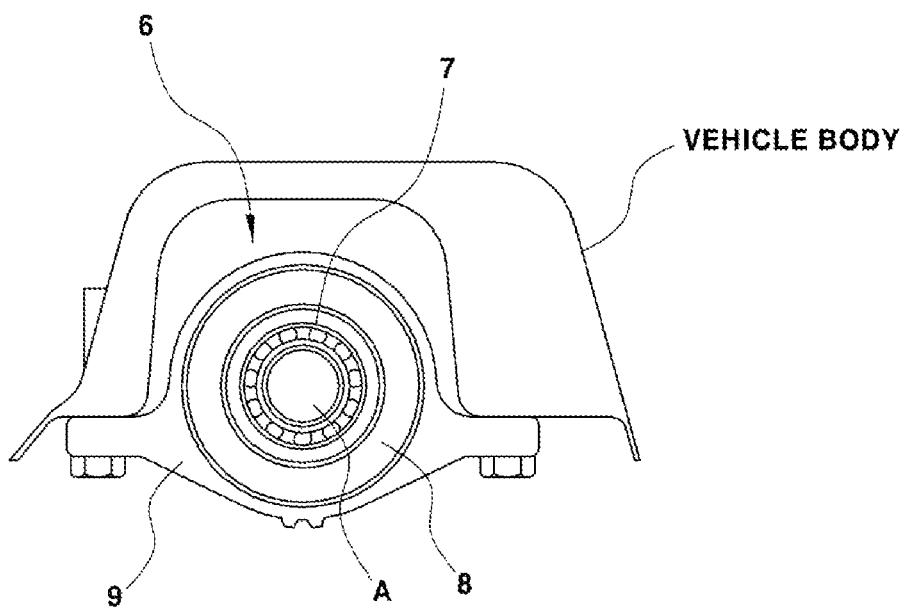
FIG. 2 is a sectional view illustrating a center bearing and bracket assembly mounted to the conventional propeller shaft.
Figure 3A:
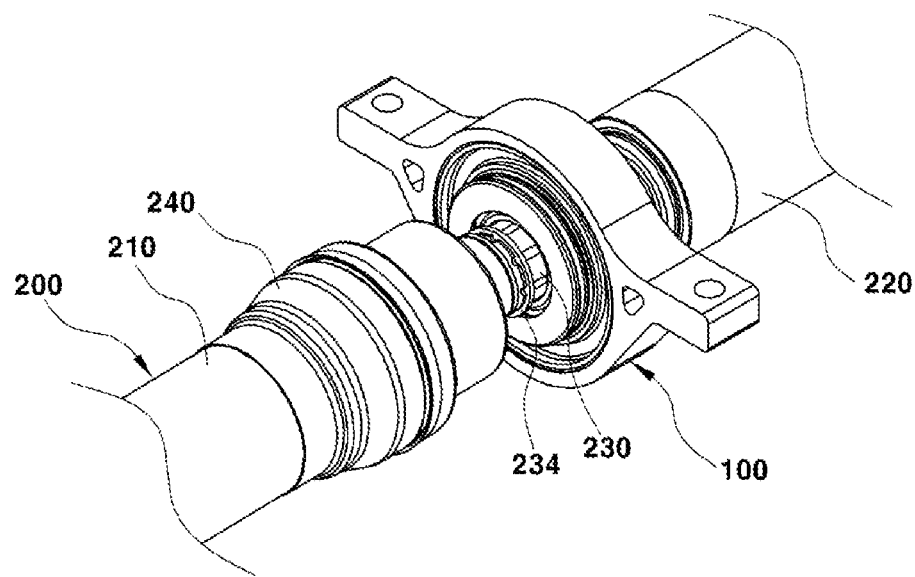
FIG. 3A and FIG. 3B are partially cut-away perspective views illustrating an exterior configuration of an exemplary center supporting device for a propeller shaft of a vehicle according to the present invention.
Figure 3B:
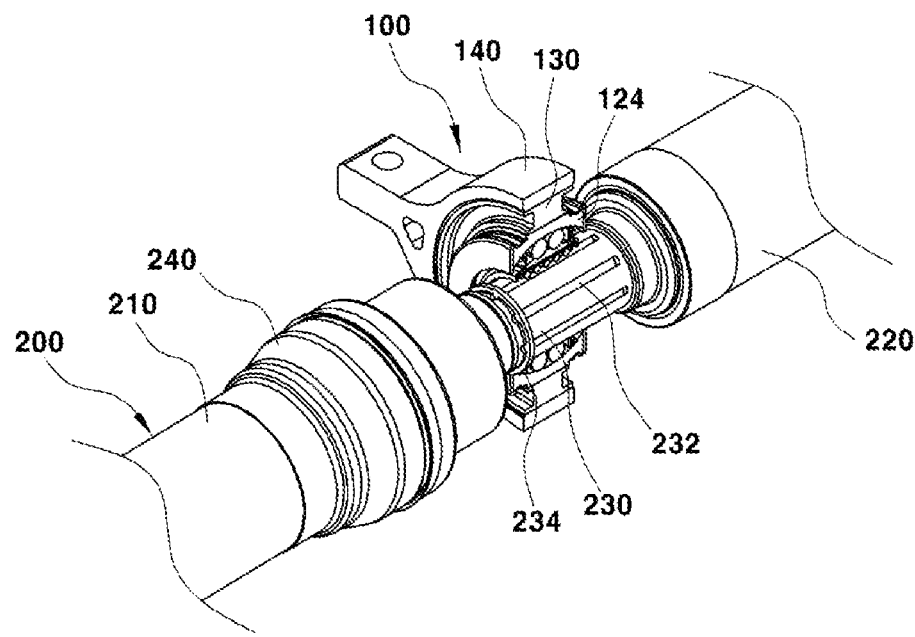
Figure 4:
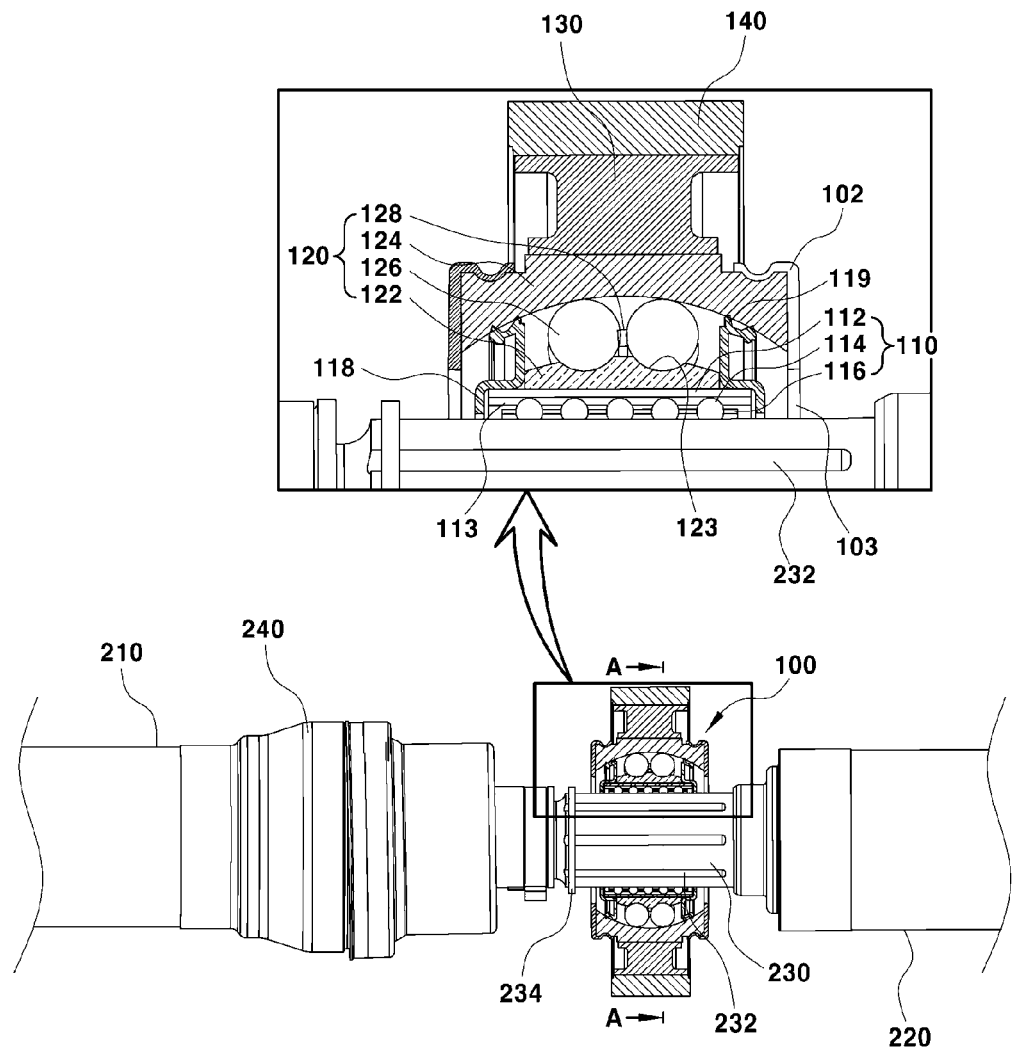
FIG. 4 is a sectional view illustrating the exemplary center supporting device for the propeller shaft of the vehicle according to the present invention.
Figure 5:
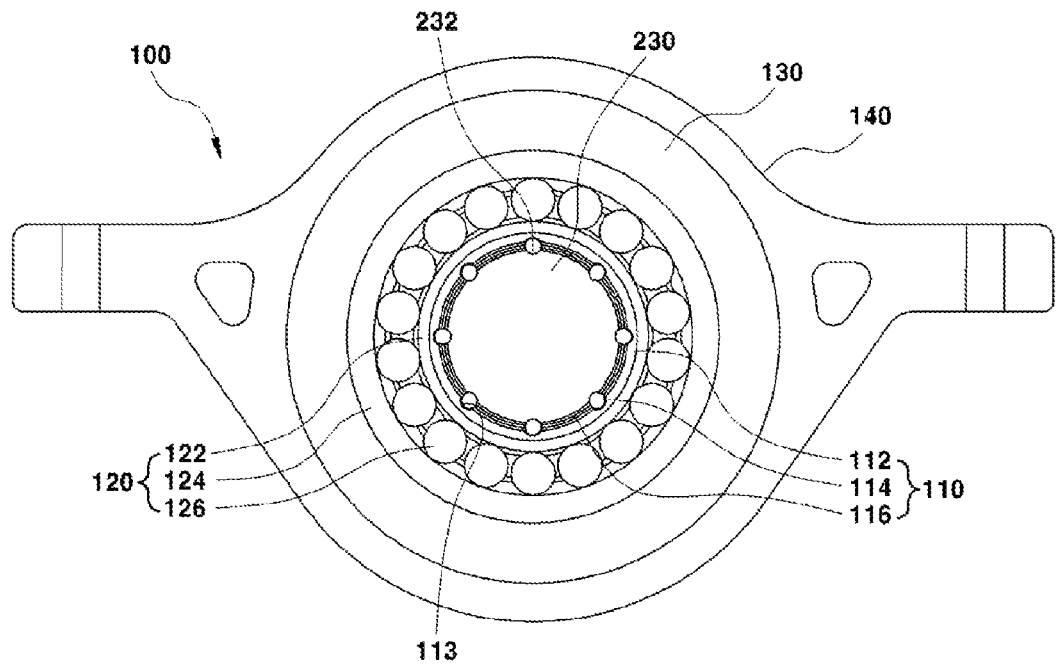
FIG. 5 is a sectional view taken along line "A-A" of FIG. 4.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the previously described conventional center bearing and bracket assembly for the propeller shaft, the insulator functions not only to isolate vibration of the propeller shaft, but also to absorb large displacement (variation in length and bending angle) of the propeller shaft caused by movement of the transmission and the rear differential gear under various traveling conditions. Therefore, the insulator requires design of a complicated structure to satisfy both noise, vibration and harshness (NVH) performance and durability and, even if the insulator is designed in this structure, the insulator may frequently suffer from durability deficiency and generation of NVH problems due to performance dispersion.

Accordingly, the present invention proposes to independently separate the vibration isolation function and the large displacement absorption function of the insulator included in the conventional center bearing and bracket assembly from each other, thereby promoting improvement in NVH performance and durability and reducing performance dispersion to achieve increased rigidity.

A center supporting device for a propeller shaft according to various embodiments of the present invention, designated by reference numeral 100, is mounted between a stub shaft of the propeller shaft and a vehicle body and serves to absorb vibration and displacement of the propeller shaft. As illustrated in FIG. 3A to FIG. 5, the center supporting device 100 generally includes an inner bearing device 110, an outer bearing device 120, and an insulator 130.

The inner bearing device 110 serves to axially movably support a stub shaft 230 that is connected between a front shaft 210 and a rear shaft 220 of the propeller shaft 200. The inner bearing device 110 includes an inner pipe 112, a plurality of inner balls 114, and an inner ball cage 116.

Figure 6:
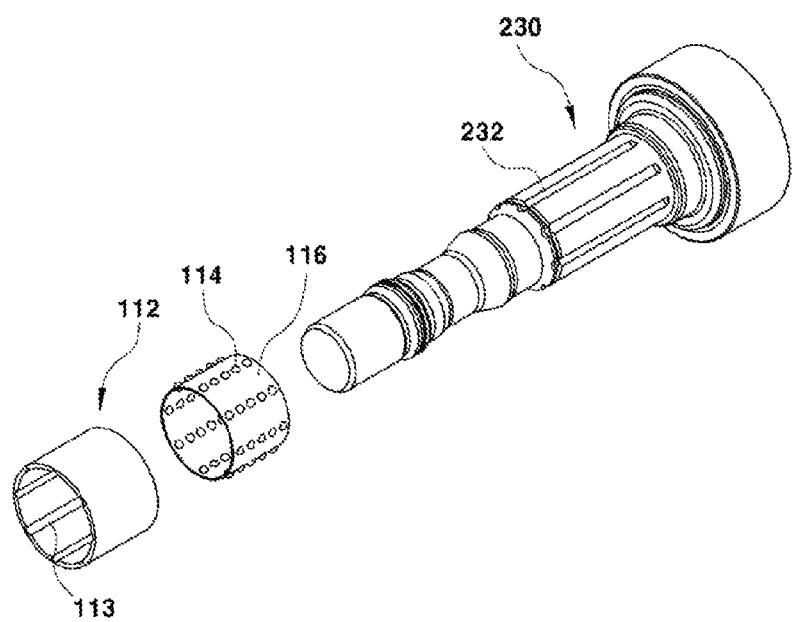
FIG. 6 is a view illustrating some components of the exemplary center supporting device for the propeller shaft of the vehicle according to the present invention.

As illustrated in FIG. 6, the inner pipe 112 takes the form of a cylinder surrounding the outer circumference of the stub shaft 230. A plurality of ball grooves 113 is formed in the axial direction at the inner circumferential surface of the inner pipe 112 and spaced apart from one another in the circumferential direction.

The inner balls 114 are arranged in the axial direction and the circumferential direction and rotatably supported between the stub shaft 230 and the inner pipe 112. The cylindrical inner ball cage 116 having a plurality of holes serves to maintain a constant spacing distance and arrangement of the inner balls 114 and to axially movably support the inner balls 114.

The inner ball cage 116 takes the form of a cylinder surrounding the inner circumference of the inner pipe 112 and the outer circumference of the stub shaft 230. The holes of the inner ball cage 116 are arranged in the axial direction and the circumferential direction for insertion of the inner balls 114.

The stub shaft 230 is bonded at one side thereof to an end of the front shaft 210 via welding and the other side of the stub shaft 230 is inserted into a center joint 240 in a spline coupling form. Ball grooves 232 are formed in a side region of the outer circumferential surface of the stub shaft 230 and spaced apart from one another in the circumferential direction such that the inner balls 114 are stably seated in the ball grooves 232. The ball grooves 232 are axially formed like the ball grooves 113 of the inner pipe 112.

Figure 8:
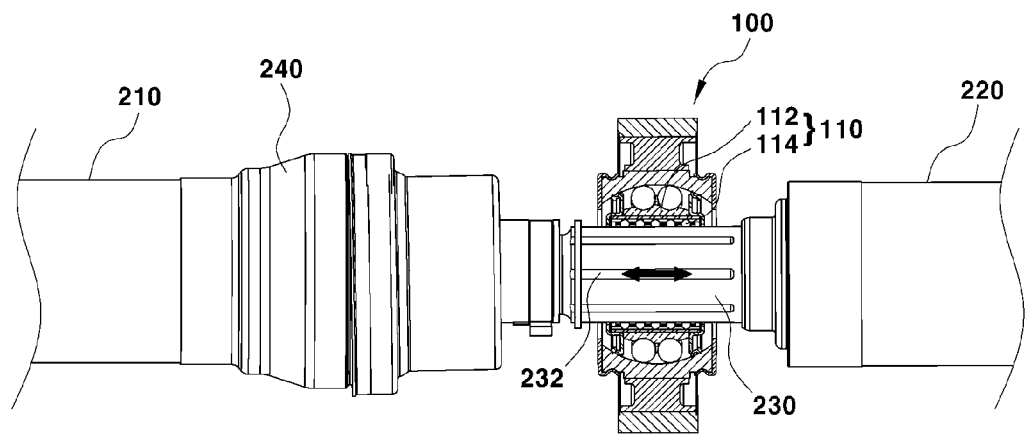
FIG. 8, FIG. 9, FIG. 10, and FIG. 11 are views for explaining functions of the exemplary center supporting device for the propeller shaft of the vehicle according to the present invention.

The inner bearing device 110 supports the stub shaft 230 by the inner balls 114 during axial movement of the stub shaft 230, thereby absorbing variation in axial length of the propeller shaft 200 due to large displacement as illustrated in FIG. 8. At this time, the inner balls 114 support the axially moving stub shaft 230 while stably rotating in the ball grooves 232 and 113 of the stub shaft 230 and the inner pipe 112.

In addition, a retainer ring 234 is press-fitted onto one side of the stub shaft 230 to prevent axial separation of the inner bearing device 110.

In addition, as illustrated in FIG. 3A to FIG. 5, the outer bearing device 120 is assembled outside the inner bearing device 110 and serves to axially rotatably support the stub shaft 230 and to absorb variation in bending angle of the propeller shaft 200 due to large displacement. The outer bearing device 120 includes an inner race 122, an outer race 124, and a plurality of outer balls 126.

The inner race 122 is assembled to the outer circumferential surface of the inner bearing device 110 and formed adjacent to the outer circumferential surface of the inner pipe 112. The inner race 122 has a spherical outer circumferential surface that is convexly raised in a rounded shape and has two circumferential ball grooves 123 formed in the outer circumferential surface thereof.

The outer balls 126 are seated in the respective ball grooves 123 so as to be arranged in the circumferential direction. An outer ball cage 128 is located between the outer balls 126 seated in the respective ball grooves 123.

Figure 7:
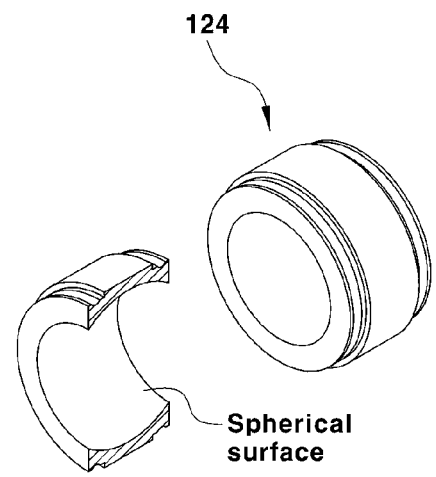
FIG. 7 is a view illustrating an outer race of the exemplary center supporting device for the propeller shaft of the vehicle according to the present invention.

The outer race 124 is mounted to the inner circumferential surface of the insulator 130 and spaced apart outward from the inner race 122 by a constant distance. As illustrated in FIG. 7, the outer race 124 has a spherical inner circumferential surface that is concavely formed in a rounded shape to correspond to the shape of the outer circumferential surface of the inner race 122.

The outer balls 126 are arranged in the circumferential direction between the inner race 122 and the outer race 124 and rotatably supported between the ball grooves 123 of the inner race 122 and the spherical inner circumferential surface of the outer race 124.

Figure 10:
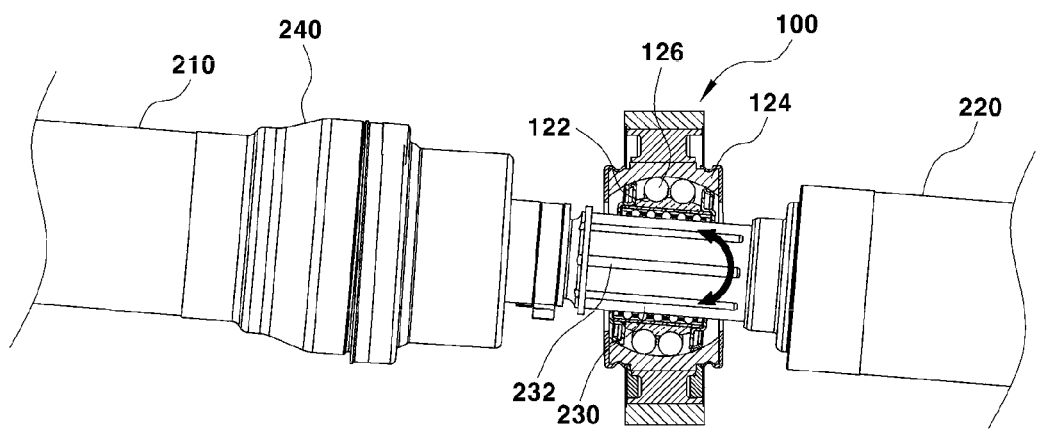

As illustrated in FIG. 10, the outer balls 126 are moved along the spherical inner circumferential surface of the outer race 124 between the spherical inner circumferential surface and the ball grooves 123 when the stub shaft 230 and the inner bearing device 110 are tilted to one side, thereby supporting the stub shaft 230 and absorbing variation in bending angle of the propeller shaft 200 due to large displacement.

At this time, to limit movement of the outer balls 126 moving along the spherical inner circumferential surface of the outer race 124, a ball stopper 118 is mounted between the inner circumferential surface of the outer race 124 and the outer circumferential surface of the inner pipe 112.

When the propeller shaft 200 is tilted, one side of the ball stopper 118 (provided with a sealing portion 119) is moved while coming into close contact with the spherical inner circumferential surface of the outer race 124 in a state in which the other side of the ball stopper 118 is fixed in close contact with the outer circumferential surface of the inner pipe 112. To this end, the sealing portion 119 is provided at one side of the ball stopper 118 so as to elastically come into close contact with the inner circumferential surface of the outer race 124.

The sealing portion 119 remains elastically in close contact with the spherical inner circumferential surface of the outer race 124 when the inner bearing device 110 and the stub shaft 230 are tilted to one side, thereby preventing leakage of oil charged in a space surrounded by the outer race 124, the inner race 122 and the ball stopper 118.

Figure 9:
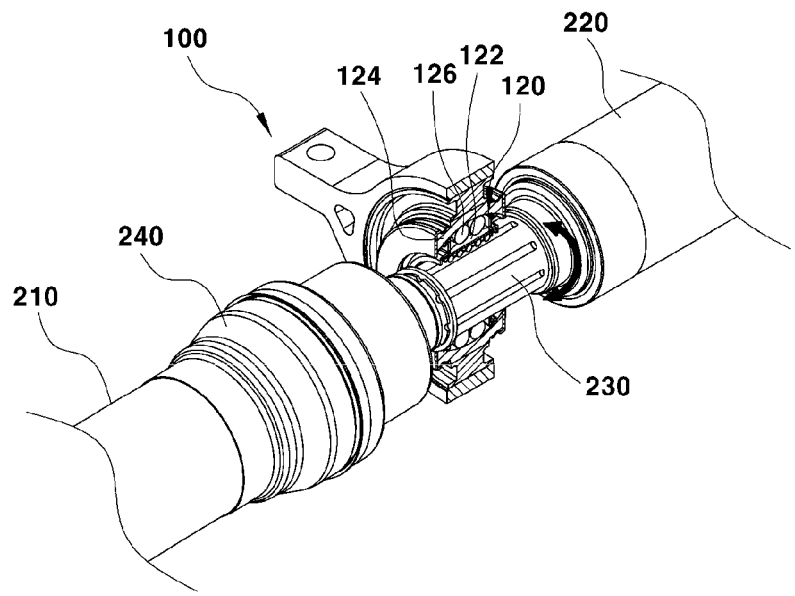

The outer bearing device 120 having the above-described configuration, as illustrated in FIGS. 9 and 10, functions to axially rotatably support the stub shaft 230 and to absorb variation in bending angle of the propeller shaft 200 due to large displacement.

Figure 11:
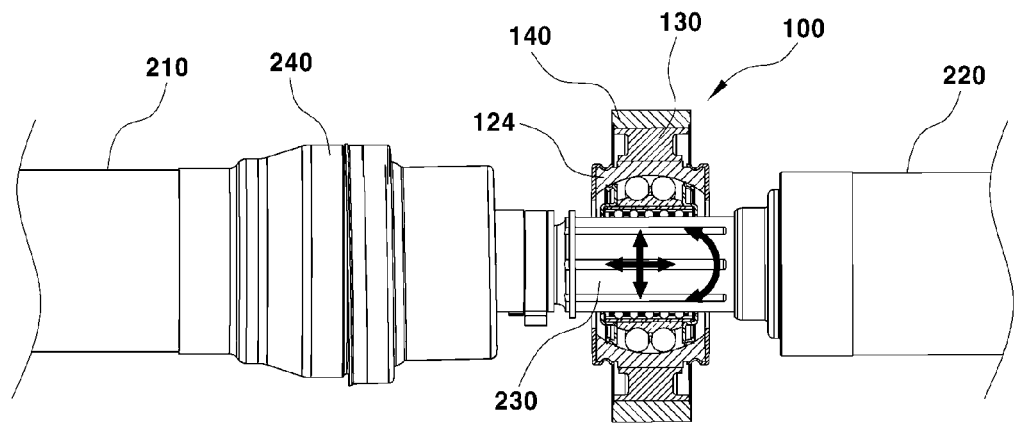

The insulator 130 is mounted between the outer circumferential surface of the outer bearing device 120 and a bracket 140 fixedly coupled to the vehicle body. As illustrated in FIG. 11, the insulator 130 functions to isolate vibration generated in the propeller shaft 200 and to absorb small displacement due to vibration. The insulator 130 is formed of a rubber material that is elastically deformed and enables vibration isolation and small displacement absorption.

Meanwhile, a cover 102 having an opening 103 for penetration of the stub shaft 230 is assembled to the outer race 124. The opening 103 has a larger diameter than a diameter of the stub shaft 230 to prevent interference with the propeller shaft 200 including the stub shaft 230.

As is apparent from the above description, in a center supporting device for a propeller shaft of a vehicle according to the present invention, an insulator functions to isolate vibration and to absorb small displacement due to vibration, which enables design of the center supporting device to achieve maximum NVH performance. In addition, a double bearing structure including outer balls and inner balls may absorb large displacement (variation in bending angle and length of the propeller shaft) caused by movement of a transmission and a rear differential gear, which may result in only very small deformation of the insulator upon generation of large displacement and, consequently, improved durability. In addition, the double bearing structure may satisfy both vibration isolation and durability in large displacement and small displacement situations owing to separation of functions of the conventional insulator, thereby achieving high rigidity without deterioration in NVH performance and durability.

In addition, through separation of functions as described above, the present invention may advantageously provide a simplified insulator structure as compared to the conventional structure and achieve improved rigidity adjustment freedom and a reduced development duration.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center supporting device for a propeller shaft of a vehicle, the device comprising:
    an inner bearing device configured to axially movably support a stub shaft, the stub shaft being connected between a front shaft and a rear shaft of the propeller shaft;
    an outer bearing device mounted outside the inner bearing device to axially rotatably support the stub shaft;
    an insulator mounted in an elastically deformable manner between the outside of the outer bearing device and a bracket fixed to a vehicle body; and
    a cover mounted on the outer bearing device and having an opening through which the stub shaft is mounted, wherein a diameter of the opening is larger than a diameter of the stub shaft,
    wherein a ball stopper is provided between an outer race of the outer bearing device and the inner bearing device and comes into contact with a spherical inner circumferential surface of the outer race,
    wherein a first side of the ball stopper is fixed in contact with an outer circumferential surface of the inner bearing device and a second side of the ball stopper is provided with a sealing portion elastically coming into contact with the spherical inner circumferential surface of the outer race, and
    wherein the diameter of the ball stopper is larger than the diameter of the opening to limit a tilting amount of the stub shaft when the propeller shaft is tilted.

2. The center supporting device of claim 1, wherein the inner bearing device includes:
    an inner pipe surrounding an outer circumferential surface of the stub shaft; and
    a plurality of inner balls rotatably supported between the stub shaft and the inner pipe.

3. The center supporting device of claim 2, wherein an inner ball cage is disposed inside the inner pipe to maintain a constant spacing distance and arrangement of the inner balls and to axially movably support the inner balls.

4. The center supporting device of claim 2, wherein the outer circumferential surface of the stub shaft and an inner circumferential surface of the inner pipe are provided with ball grooves, the ball grooves being formed in the axial direction and spaced apart from one another in a circumferential direction for stabilized seating of the inner balls.

5. The center supporting device of claim 1, wherein the outer bearing device includes:
    an inner race surrounding an outer circumferential surface of the inner bearing device;
    the outer race surrounding an inner circumferential surface of the insulator; and
    outer balls arranged in a circumferential direction and rotatably supported between the inner race and the outer race.

6. The center supporting device of claim 5, wherein the outer race has the spherical inner circumferential surface surrounding the inner bearing device, the inner race has a ball groove formed in an outer circumferential surface thereof for seating of the outer balls, and the outer balls are movable along the spherical inner circumferential surface of the outer race between the spherical inner circumferential surface and the ball groove.

7. The center supporting device of claim 1, wherein a retainer ring is mounted at one side of the stub shaft to prevent axial separation of the inner bearing device.

* * * * *